No. 757,852. PATENTED APR. 19, 1904.
E. C. WASHBURN.
LATERAL MOTION CAR TRUCK.
APPLICATION FILED DEC. 5, 1903.
NO MODEL.
3 SHEETS—SHEET 1.
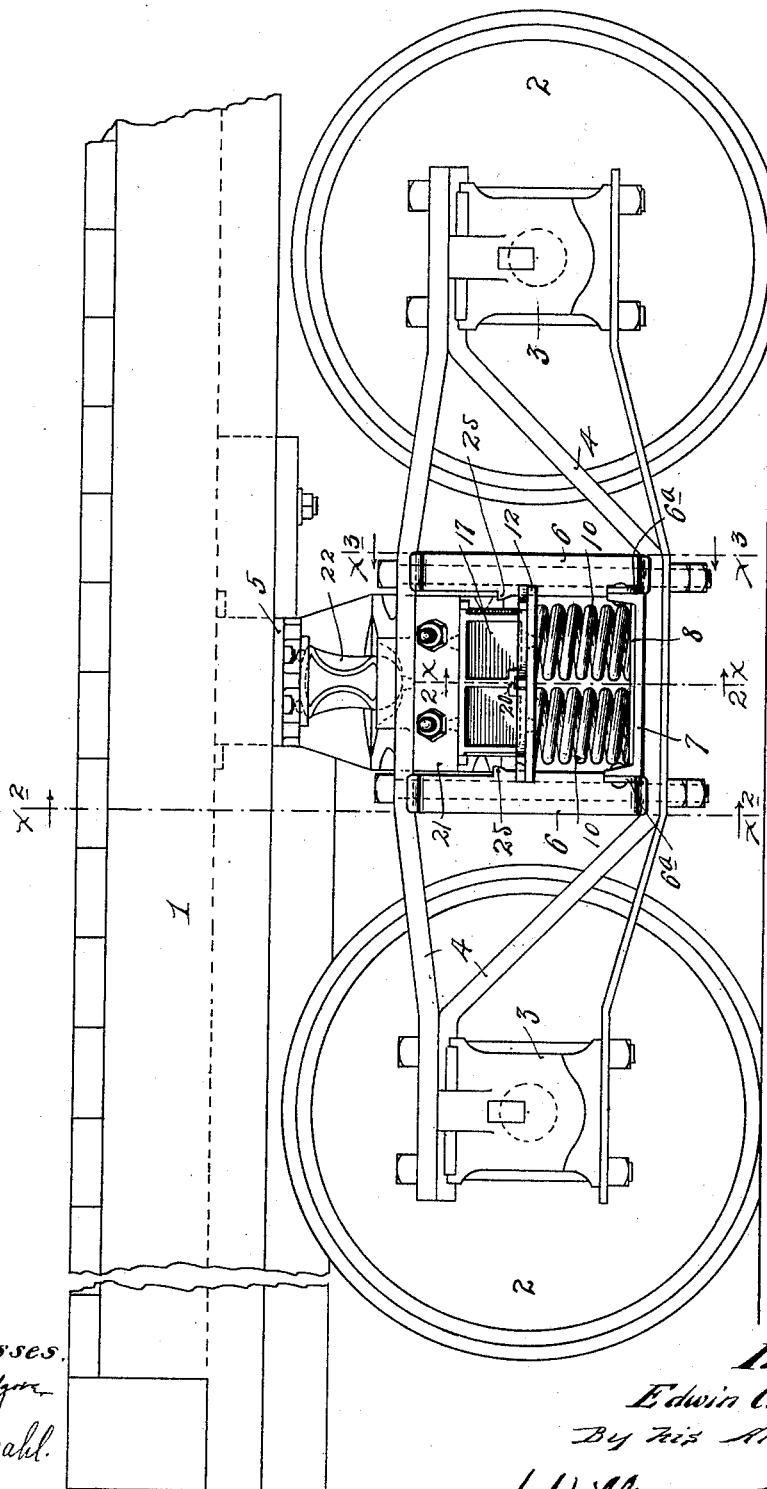

No. 757,852. PATENTED APR. 19, 1904.
E. C. WASHBURN.
LATERAL MOTION CAR TRUCK.
APPLICATION FILED DEC. 5, 1903.
NO MODEL. 3 SHEETS—SHEET 2.
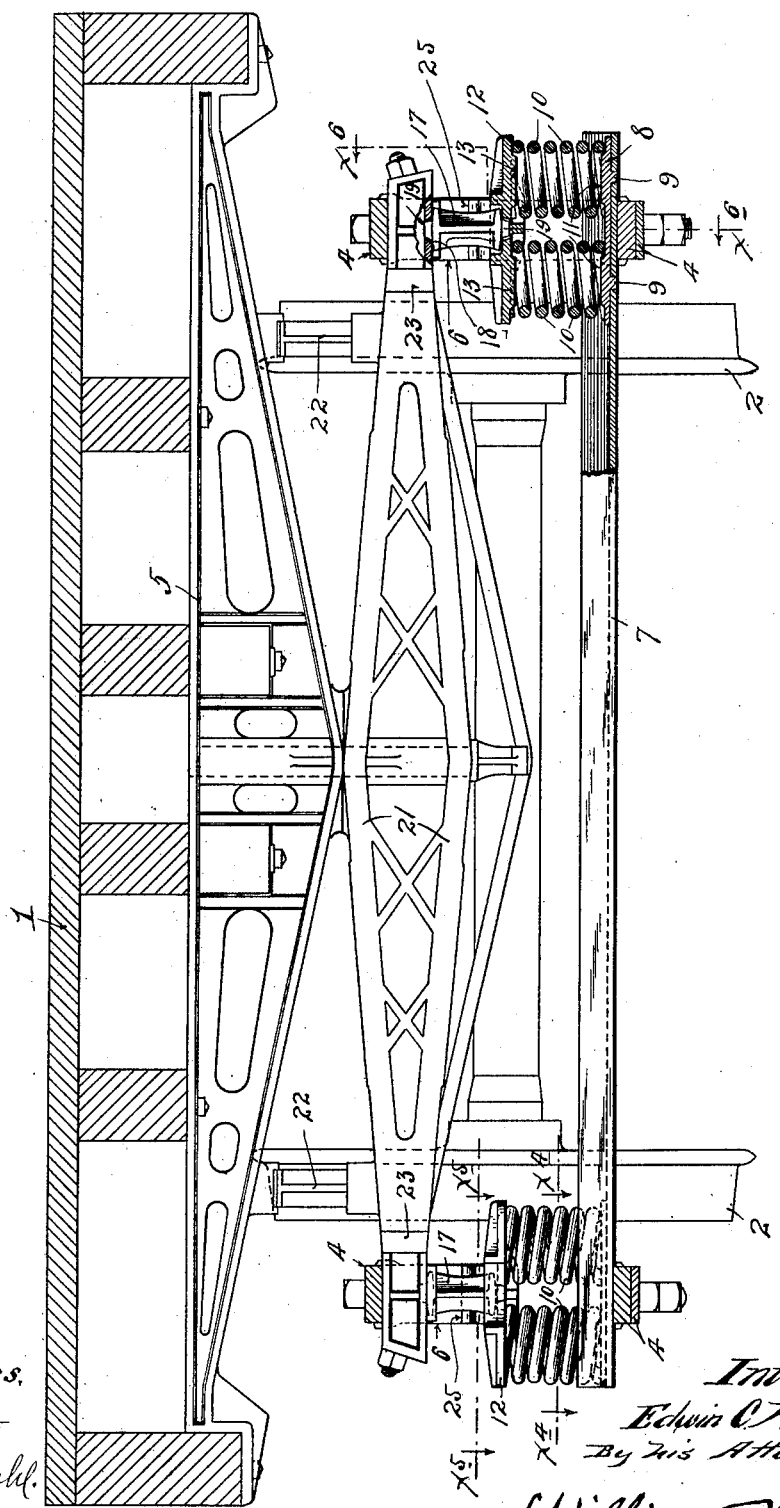

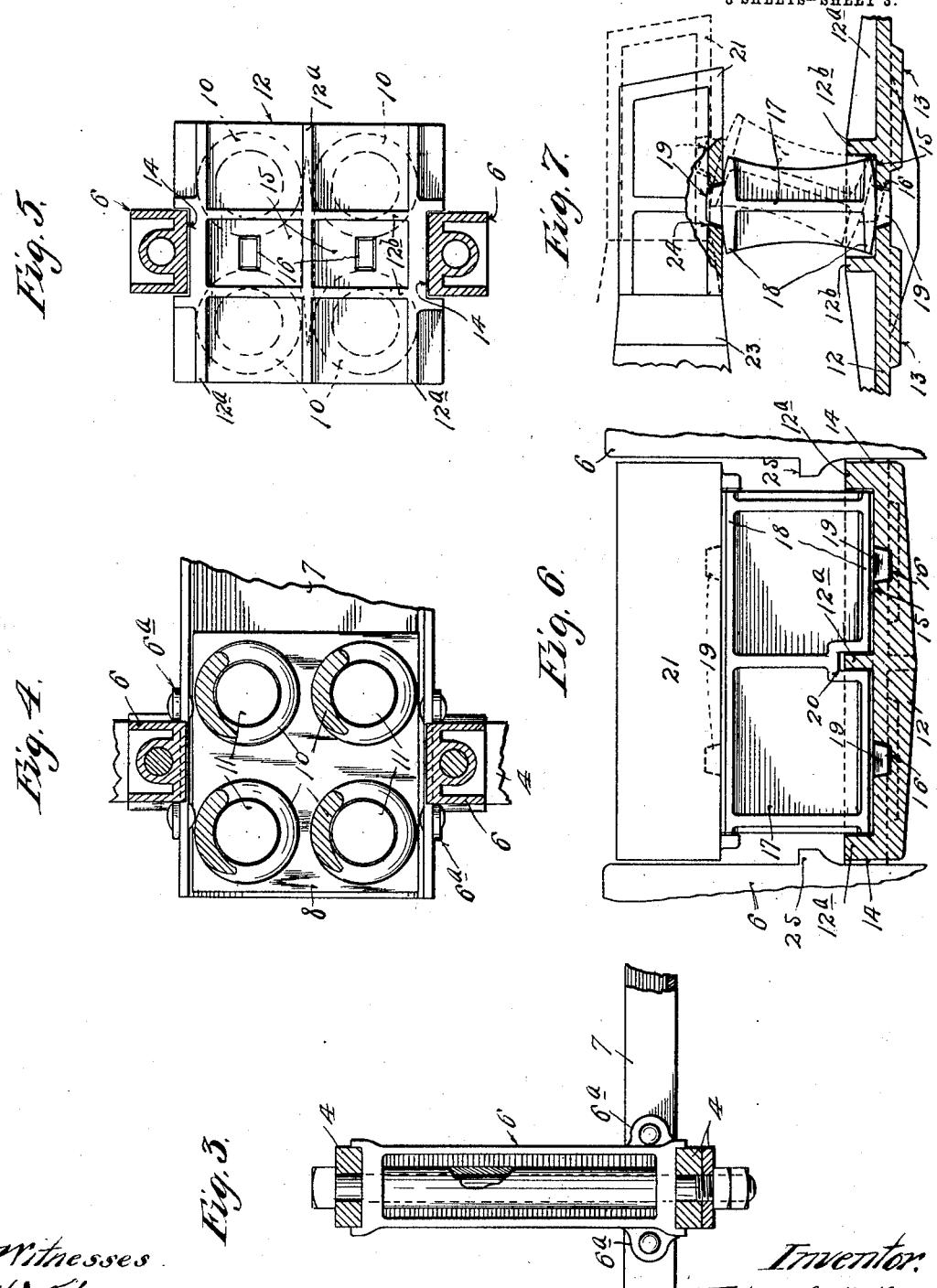

No. 757,852. Patented April 19, 1904.

UNITED STATES PATENT OFFICE.

EDWIN C. WASHBURN, OF MINNEAPOLIS, MINNESOTA.

LATERAL-MOTION CAR-TRUCK.

SPECIFICATION forming part of Letters Patent No. 757,852, dated April 19, 1904.

Application filed December 5, 1903. Serial No. 183,860. (No model.)

*To all whom it may concern:*

Be it known that I, EDWIN C. WASHBURN, a citizen of the United States, residing at Minneapolis, in the county of Hennepin and State of Minnesota, have invented certain new and useful Improvements in Lateral-Motion Car-Trucks; and I do hereby declare the following to be a full, clear, and exact description of the invention, such as will enable others skilled in the art to which it appertains to make and use the same.

My present invention relates to car-trucks, and has for its especial object to provide an improved lateral-motion device therefor for permitting limited movements of the car-body transversely of the trucks, or vice versa; and to this end it consists of the novel devices and combinations of devices hereinafter described, and defined in the claims.

The invention is illustrated in the accompanying drawings, wherein like characters indicate like parts throughout the several views.

Figure 1 is a side elevation showing a car-truck and a portion of a car-body and illustrating my improved lateral-motion devices applied thereto. Fig. 2 is a transverse vertical section through the car, some parts being sectioned on a line $x^2\ x^2$ of Fig. 1 and other parts being sectioned on the line $2^\times\ 2^\times$ of the same view. Fig. 3 is a detail in section on the line $x^3\ x^3$ of Fig. 1. Fig. 4 is a horizontal section on the line $x^4\ x^4$ of Fig. 2, some parts being broken away. Fig. 5 is a detail in horizontal section on the line $x^5\ x^5$ of Fig. 2. Fig. 6 is a vertical section on the irregular line $x^6\ x^6$ of Fig. 2; and Fig. 7 is an enlarged detail view, principally in section on the line $2^\times\ 2^\times$ of Fig. 1, but with some parts shown in full and with others broken away.

The numerals 1, 2, 3, and 4 indicate, respectively, the car-body, the wheels, the journal-boxes, and the trussed side frames, which latter are, as shown, the type of truck-frame known as "diamond" frames.

The numeral 5 indicates one of the body-bolsters, which is of course rigidly secured to the car-body 1. The trussed side frames include pedestals 6, and the lower ends of the pair of columns 6 on the opposite sides of the truck are rigidly tied together by a so-called "spring-plank" or transom 7, shown as afforded by a bar of channel-iron, to the flanges of which laterally-projecting lugs $6^a$ of the bolster-column 6 are riveted. Spring-bases 8 rest upon the ends of the spring-plank 7, between the flanges thereof, and are provided with depending lugs 9, which enter into seats formed in said spring-plank to hold said bases in position. Coiled springs 10, as shown, four in each group, rest upon spring-bases 8, the latter having slightly-raised bosses 11, which hold the lower end of said springs against lateral displacements. A "spring-cap" 12, so called, rests upon each group of four springs, the same having depending bosses 13, which hold the upper ends of said springs against lateral displacements. These spring-caps 12 move vertically and are provided in their sides with notches 14, that receive the adjacent edges of the coöperating bolster-columns 6, as best shown in Fig. 5. These so-called "spring-caps" 12 afford base-supports for rocking segments of the lateral-motion device, and to adapt them to serve as such supports they are formed in their upper faces in line with the bolster-columns 6 with flat bearing-surfaces 15, which at approximately their centers have depressed lug-seats 16. As shown, the upper faces of said combined spring-caps and base-supports 12 are provided with strengthening-ribs $12^a$ and $12^b$.

The so-called "flattened" segments 17 are formed at their upper and lower ends with segmentel bearing-surfaces 18 and upper and lower lugs or teeth 19. These segmental bearing-surfaces 18 are segments of circles which radii are considerably greater than the lengths of the so-called "segments" 17, so that the diagonal distance between the edges of the upper and lower segmental surfaces is materially greater than the distance between the central or intermediate portions of the said two segmental surfaces, this being done for an important purpose, which will presently appear. The lower segmental surfaces 18 of said segments 17 rest upon the flat bearing-surfaces 15 of the coöperating caps or plates 12, while their lugs or teeth 19 engage the seats 16 of the said caps. It may be here noted that the segments 17 at their lower ends are formed with centrally-located notches 20, that straddle or embrace the central flange 12ª of the said caps 12, as best shown in Fig. 6, and coöperate therewith to hold the said segments in proper working position.

The truck-bolster 21, which in itself involves certain novel features which will be claimed in a companion application filed of even date herewith, is pivotally connected at its central portion with the central portion of the body-bolster 5 in the usual or any suitable way and near its ends carries side bearings in the form of rocking segments 22, the uper ends of which engage with the body-bolster 5 in a manner not necessary for the purposes of this case to further consider.

The ends of the truck-bolster 21 are reduced and work between the bolster-columns 6 below the top arch-bars of the trussed side frame, and the said bolster has stop-lugs or flanges 23, that engage with the said bolster-columns to limit the movements of the truck-bolster transversely of the truck. The under surfaces of the reduced ends of the truck-bolster are flattened, and these flattened surfaces rest upon the upper end segmental surfaces 18 of the oscillating segment 17, as best shown in Figs. 2, 6, and 7. The lugs or teeth 19 at the upper ends of the rocking segments 17 engage seats 24, formed in the under surfaces of the ends of the truck-bolster.

The bolster-columns 6 on their inner faces are formed with rest-lugs 25, which are so located that the ends of the truck-bolster will not normally engage them, but will drop onto the same should the springs 10 be broken, removed, or overloaded. These rest-lugs 25 therefore serve as alternative supports for the truck-bolster to hold the same in operative position even though the spring-support and lateral-motion devices therefor be thrown out of action or rendered inoperative.

With the above-described construction it is evident that the truck-bolster is free for limited longitudinal movement transversely of the truck and at the same time is spring-supported. By reference to Fig. 7 it will be noted that when the truck-bolster is moved endwise or transversely of the truck from its normal or centered position shown by full lines into the position indicated by dotted lines in said view it is raised. This being the case, it of course follows that the weight of the load on the truck-bolster acting on the oscillating segment 17 will tend to throw the truck-bolster back into its centered or normal position and will tend to maintain the same in such centered position. Otherwise stated, as the body of the car is thrust sidewise or when the truck is thrown laterally with respect thereto, as is the case in rounding a curve in the track, the truck-bolster will be moved endwise transversely of the truck to relieve the flanges of the wheels from intense strain, but will immediately assume its normal or centered position under the weight of the load. Of course the so-called "rocking" or "oscillating" segment 17 would oscillate and permit lateral or transverse movements of the bolster even if its so-called "flanged" ends were flattened to the extent of extending them parallel to each other; but this suggested construction would not be satisfactory, because the leverage of the segment in lifting the load would be shifted instantly from the central to the end portions of the said flattened surfaces, while with the flattened segmental surfaces the leverage is shifted with a rocking action between the said points. In effect, the rocking segments 17 are fulcrumed at their lower ends, so that if flattened only at their upper ends they would have a tendency to maintain the truck-bolster in a centered position under the weight of the load. However, with the said segments flattened at both ends the tendency to maintain the truck-bolster in a centered position is greatly increased. The lugs or teeth 19 of the said oscillating segments 17 are very important, for the obvious reason that they hold the ends of the segments against displacement with respect to the parts with which they engage.

From what has been said it will be understood that the construction described is capable of modification within the scope of my invention as herein set forth and claimed.

What I claim, and desire to secure by Letters Patent of the United States, is as follows:

1. The combination with a car-truck having bolster-columns and a transversely-movable bolster guided by said columns, spring-supported caps guided for vertical movements by said bolster-columns, and flattened segments supporting said bolster from said spring-supported caps and tending to hold said bolster centered under the weight of the load, substantially as described.

2. The combination with a car-truck, of spring-supported caps vertically movable thereon, oscillating segments fulcrumed on said caps, and provided with flattened segmental upper ends, and a truck-bolster, resting on said segments, with freedom for longitudinal movements transversely of the truck and tending to maintain a centered position under the weight of the load.

3. The combination with a truck and a truck-bolster movable transversely thereof, of spring-supported caps movable vertically on the truck-frame, bolster-supporting segments, flattened at both ends, and a truck-bolster resting on the flattened upper ends of said segments, said bolster being yieldingly held in a centered position under the weight of the load, and the said segments having, at their upper and lower ends, teeth engaging, respectively, with seats formed in the ends of said bolster and in said spring-supported caps, substantially as described.

4. The combination with a truck and a truck-bolster movable transversely thereof, of spring-caps guided for vertical movements by the bolster-columns of the truck-frame, and groups of coiled springs supporting said spring-caps from the truck side frames, and the oscillating segments supporting said truck-bolster from said spring-caps, said segments having flattened segmental ends and projecting teeth or end lugs engaging with said truck-bolster and with said spring-caps, substantially as described.

5. The combination with a truck and a truck-bolster movable transversely thereof, of the spring-caps 12 formed in their upper faces with a central rib $12^a$, flat bearing-surfaces 15 and seats 16, and formed at their sides with notches 14 embracing the adjacent edges of the truck-bolsters of the truck-frame, the groups of coiled springs 10 supporting said spring-caps in the truck side frames, and the oscillating segments 17 formed at their ends with the flattened segmental surfaces 18 and lugs 19, the lower surfaces 18 and lower lugs 19 engaging, respectively, with the bearing-surfaces 15 and seats 16 of said spring-caps, and the upper surfaces 18 and upper lugs 19 engaging, respectively, with the lower end surfaces of the truck-bolster and with seats formed in said bolster, the lower ends of said segments being notched to straddle the ribs $12^a$ of said spring-caps, substantially as described.

6. The combination with a truck-frame involving truck-bolsters having rest-lugs located slightly below the normal positions of the ends of the truck-bolsters, of a truck-bolster spring-supported from the truck side frames, and adapted to engage said rest-lugs when the said bolster is dropped to an abnormally low position, substantially as described.

7. In a car-truck, the combination with a truck-bolster, of flattened rocking segments supporting said bolster, and segment-supports provided with central strengthening-ribs fitting notches formed in the lower ends of said rocking segments, substantially as described.

In testimony whereof I affix my signature in presence of two witnesses.

EDWIN C. WASHBURN.

Witnesses:
R. C. MABEY,
F. D. MERCHANT.